March 9, 1965   D. JACKSON   3,172,344
CAMERAS
Filed Oct. 21, 1960
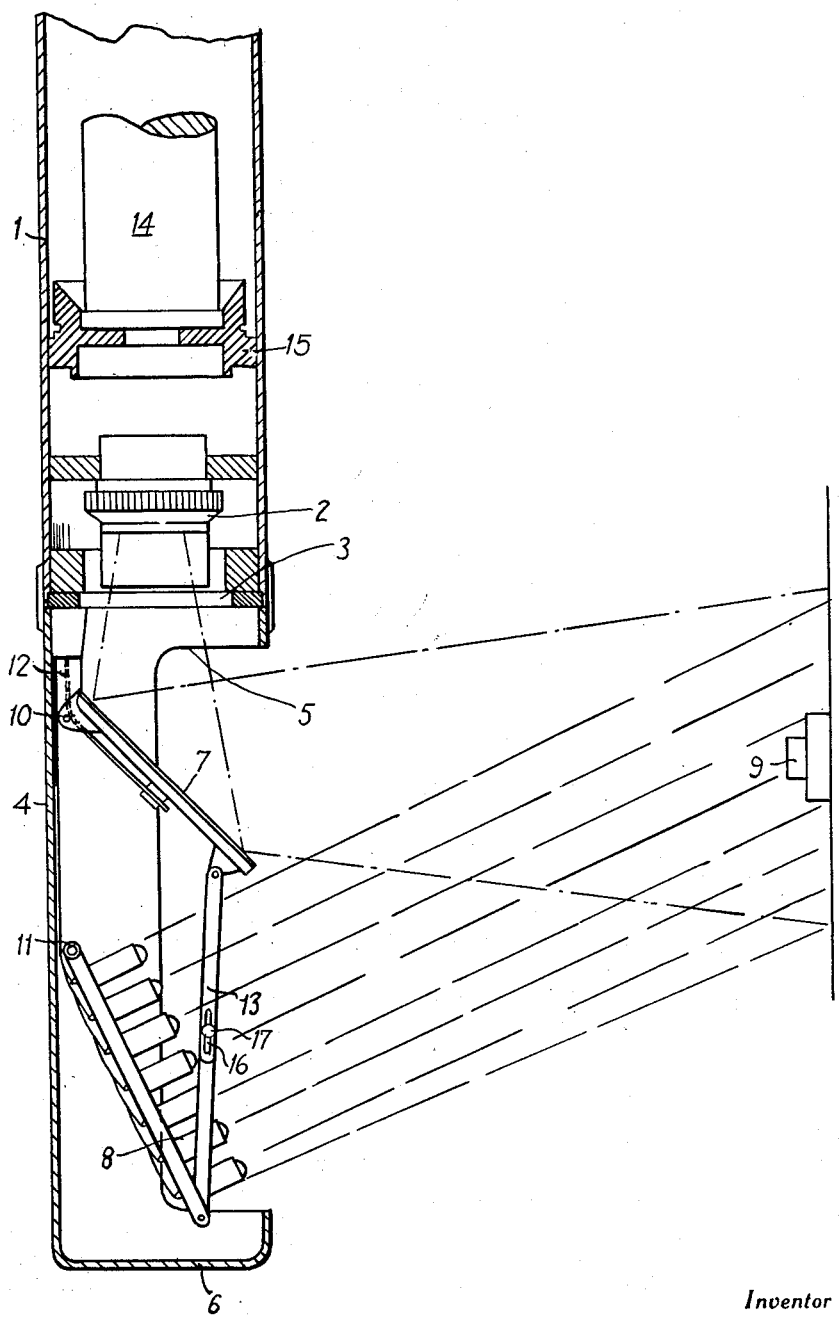
Inventor
Donald Jackson
By
Attorneys United States Patent Office 3,172,344
Patented Mar. 9, 1965

3,172,344
CAMERAS
Donald Jackson, Cambridge, England, assignor to Pye Limited, Cambridge, England, a British company
Filed Oct. 21, 1960, Ser. No. 64,178
Claims priority, application Great Britain, Oct. 26, 1959, 36,172/59
3 Claims. (Cl. 95—11)

The present invention relates to cameras, particularly television cameras of small size so that they can be used for inspection purposes in confined spaces, for example in atomic reactors.

The invention consists in a camera having support means projecting forwardly of the camera lens and carrying a mirror in a position in front of the lens and inclined to the lens axis so as to reflect into the camera lens light from an object to be viewed which is disposed to one side of the camera, and also carrying a light source disposed so as to illuminate the object to be viewed and so arranged to the side of the mirror remote from the lens that the mirror acts as a screen to prevent light from said source from falling directly on the lens.

The mirror is preferably adjustably mounted so that it can be inclined to different angles to the axis of the lens to adjust the angle of view, and means may be provided for controlling the adjustment from a remote point. The light source may be directional and may be adjustably mounted; its adjusting means may be remotely controlled and is preferably coupled to the mirror adjusting means so that the light will follow any change in the angle of viewing of the lens.

According to a feature of the invention the supporting means comprises a tubular housing which accommodates the mirror and light source and has an opening along one side to allow light from the light source to be projected on to the object and light from the object to impinge on the mirror.

For a television camera for use in atomic reactors, the camera preferably comprises an elongated cylindrical housing which accommodates the camera components and has a lens at one end, a tubular extension in front of the lens forming the supporting means for the mirror and light source. The tubular extension conveniently has the same diameter as the camera housing and may be integral therewith or formed as a separate part which is secured to the front end of the camera housing.

The invention also consists in an attachment for a camera comprising a mirror and light source arranged as above described.

In order that the invention may be more clearly understood, an embodiment thereof will now be described with reference to the accompanying drawing which shows a section through the front end of a television camera suitable for use in an atomic reactor.

Referring to the drawing, the camera components are housed in a tubular cylindrical housing 1 having the camera lens 2 at one end thereof. The lens may be mounted behind an end window 3. The camera pick-up tube is shown at 14 carried by support 15. At its front end the housing 1 is provided with a tubular extension 4 having part of its wall cut away to form an opening 5. The end of the tubular extension may have a closing wall 6, within this tubular extension and facing the opening 5 are mounted a mirror 7 and a light source 8. The mirror 7 is mounted at an inclined position in front of the lens 2 so that it reflects light from an object 9 disposed to the side of the camera into the lens 2. The light source 8, which may comprise a bank of small electric bulbs, is arranged to illuminate the object 9.

Both the mirror 7 and the light source 8 may be mounted for hinging movement in the tubular extension, for example on the pivots 10 and 11 respectively, so that the angle of view seen by the lens may be adjusted. The adjustment may be by remote control means, indicated by the flexible cable 12. The mirror 7 and light sources 8 are preferably coupled together for simultaneous movement so that the light source will always illuminate the object to be viewed. This coupling is diagrammatically indicated by the link 13. Means such as the slot 16 and locking screw 17 may be provided for varying the length of the link or the coupling ratio, either by preliminary adjustment or by remote control means, so that the light beam converges with the camera view at the required distance from the camera lens. This can be achieved automatically if the means for adjusting the coupling ratio are controlled by the camera focus control.

By means of the construction described light from the light source 8 is prevented from entering the lens 2 by reason of the mirror 7 being interposed in the direct light path, the mirror being so proportioned and positioned that it forms an effective light screen. No window is fitted in the opening 5 as this would cause light from the light source to be reflected into the camera lens.

If the main camera assembly be made watertight, the apparatus is capable of operating when submerged in a liquid.

I claim:

1. A camera comprising a housing projecting forwardly of the camera lens, a mirror adjustably mounted in said housing in front of said lens for inclination at different angles to the lens axis to sweep a field of view extending parallel to said axis and with its reflecting surface on the side adjacent the lens so as to reflect into the camera lens light entering the housing from an object in said field of view, a directional light source in said housing for illuminating the object to be viewed, means for adjustably supporting said light source in alignment with said lens and mirror on the side of the mirror remote from the lens, said mirror being supported by means such that it acts as a screen to prevent light from said source from falling directly on said lens, means for adjusting the inclination of said mirror from a remote point, and mechanical means coupling said mirror and said light source so that adjustment of said mirror also causes adjustment of said light source whereby the light will follow any change in the angle of viewing of said lens while remaining screened from said lens by said mirror.

2. An attachment for a camera comprising a support having means at one end thereof defining an aperture, means for fixing said support to a camera with the aperture substantially coaxial with said lens, a mirror, means adjustably mounting said mirror in line with said aperture for inclination at different angles to the axis of the aperture to sweep a field of view extending parallel to said axis and with its reflecting surface on the side adjacent said aperture so as to reflect, through said aperture, light from an object in said field of view, a directional light source for illuminating the object to be viewed, means adjustably mounting said light source on said support in alignment with said aperture and mirror on the side of the mirror remote from said aperture, said mirror being supported by means such that it acts as a screen to prevent light from said source from passing directly through said aperture, means for adjusting the inclination of said mirror from a remote point, and mechanical means coupling said mirror and said light source so that adjustment of said mirror also causes adjustment of said light source whereby said light source will illuminate the object to be viewed while remaining screened from said aperture by said mirror.

3. An attachment for a camera comprising a tubular housing having an opening along one side thereof and the walls of the housing defining an aperture at one end, means for fixing said tubular housing to a camera with the aperture in line with the camera lens and with the longitudinal axis of the housing substantially coaxial with the optical axis of said lens, a mirror pivotally mounted in said housing for adjustable inclination relative to the axis of the housing to sweep a field of view extending parallel to said axis and with its reflecting surface on the side adjacent said aperture so as to reflect, through said aperture, light from an object viewed through said opening by said mirror, means for adjusting the inclination of said mirror from a remote point, a battery of lamps forming a directional light source for illuminating the object to be viewed by said mirror, means pivotally mounting said battery of lamps in said housing in alignment with said aperture and mirror on the side of the mirror remote from said aperture, said mirror being supported by means such that it acts as a screen to prevent light from said lamps from passing directly through said aperture, and mechanical means coupling said mirror and said light source so that adjustment of said mirror also causes adjustment of the light source whereby said light source will illuminate the object to be viewed while remaining screened from said lens by said mirror, said coupling including means for varying the coupling ratio.

References Cited in the file of this patent
UNITED STATES PATENTS

| | | |
|---|---|---|
| 1,658,537 | Reinhold | Feb. 7, 1928 |
| 1,895,239 | Venzie | Jan. 24, 1933 |
| 2,079,233 | Wappler | May 4, 1937 |
| 2,292,044 | Bucky | Aug. 4, 1942 |
| 2,422,077 | Bucky | June 10, 1947 |
| 2,600,168 | Klyce | June 10, 1952 |
| 2,899,856 | Shull | Aug. 18, 1959 |
| 3,019,292 | John | Jan. 30, 1962 |

FOREIGN PATENTS

| | | |
|---|---|---|
| 124,394 | Sweden | Mar. 22, 1949 |